Jan. 21, 1941. L. W. STINNE 2,229,394
HYDRAULIC STEERING APPARATUS
Filed Feb. 13, 1939 2 Sheets-Sheet 1

Leslie W. Stinne
INVENTOR.
BY
ATTORNEY.

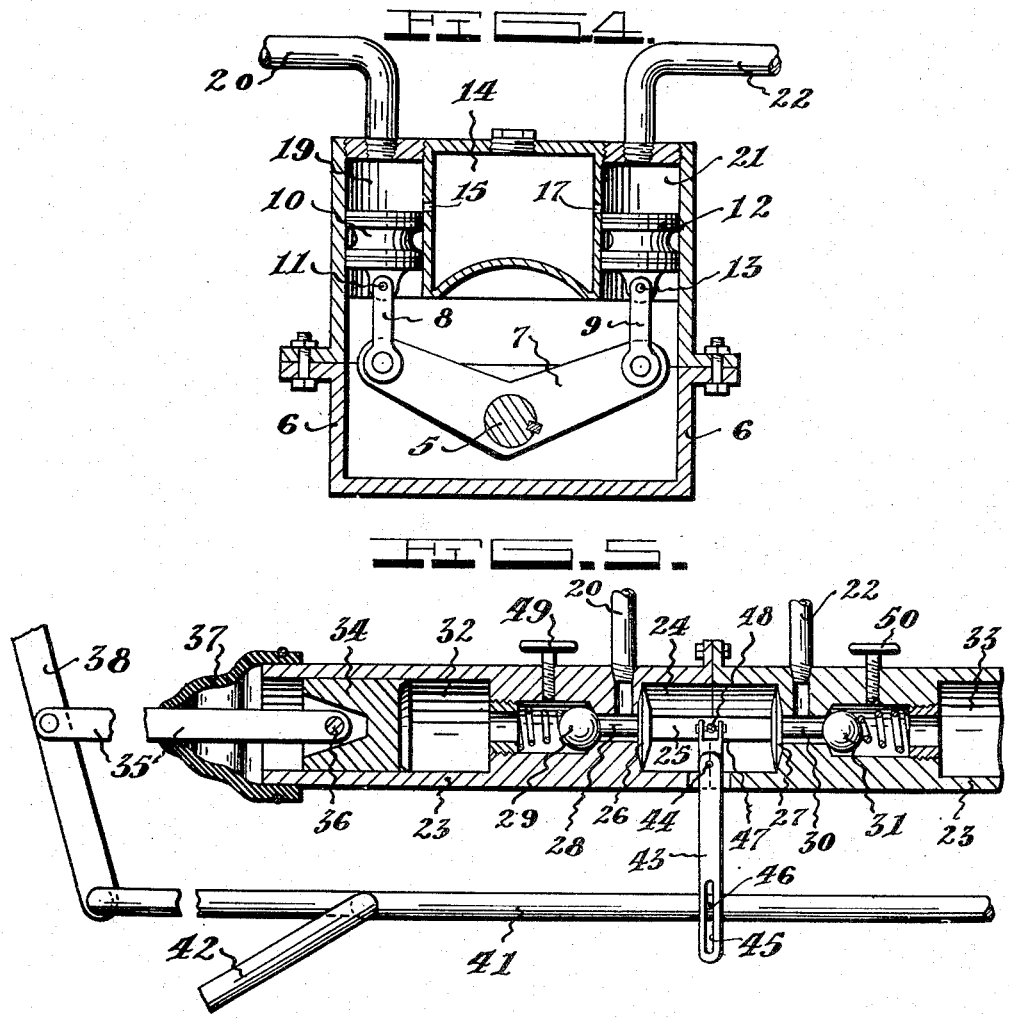

Patented Jan. 21, 1941

2,229,394

UNITED STATES PATENT OFFICE 2,229,394

HYDRAULIC STEERING APPARATUS

Leslie W. Stinne, Wynne, Ark.

Application February 13, 1939, Serial No. 256,175

4 Claims. (Cl. 280—87)

This invention relates to hydraulic steering and it has particular reference to an apparatus especially adaptable for use in the steering of automobiles, trucks and busses.

The principal object of the invention is to provide an hydraulic apparatus for the control of the steering mechanism of motor vehicles whereby the position of the steering mechanism is under the control of an operator at all times.

Another object of the invention is to provide in an hydraulic steering apparatus means whereby the wheels of a vehicle may be controlled in case of failure of any part of the hydraulically operated mechanism.

Still another object of the invention is to provide a structure which may be made light in weight, thereby allowing for adaptation to aircraft, and which may, when so desired, be fabricated to withstand heavy stresses such as are imposed, for example, on the steering mechanism of ships.

Yet another object is to provide an hydraulic steering mechanism having oppositely disposed pistons connected through linkages to the units to be moved, and diaphragm means interposed between the pistons, and being arranged to control a pair of check valves in such a manner that the assembly is constrained to move to a desired position and to remain in this position unless manually changed by an operator.

Another object of the invention is to provide valve means by which air may be readily bled from the system thereby insuring efficient operation under all conditions.

With the foregoing objects as paramount, the invention has particular reference to its salient features of construction and arrangement of parts which will become manifest as the description proceeds, taken in connection with the accompanying drawings, wherein:

Figure 4 is a longitudinal view in vertical section and illustrating the pair of master cylinders together with the pistons positioned therein and their interconnecting linkages, and Figure 5 is a fragmentary plan view of the piston diaphragm valve and linkages positioned intermediate the front wheels of a motor vehicle.

Figure 1:
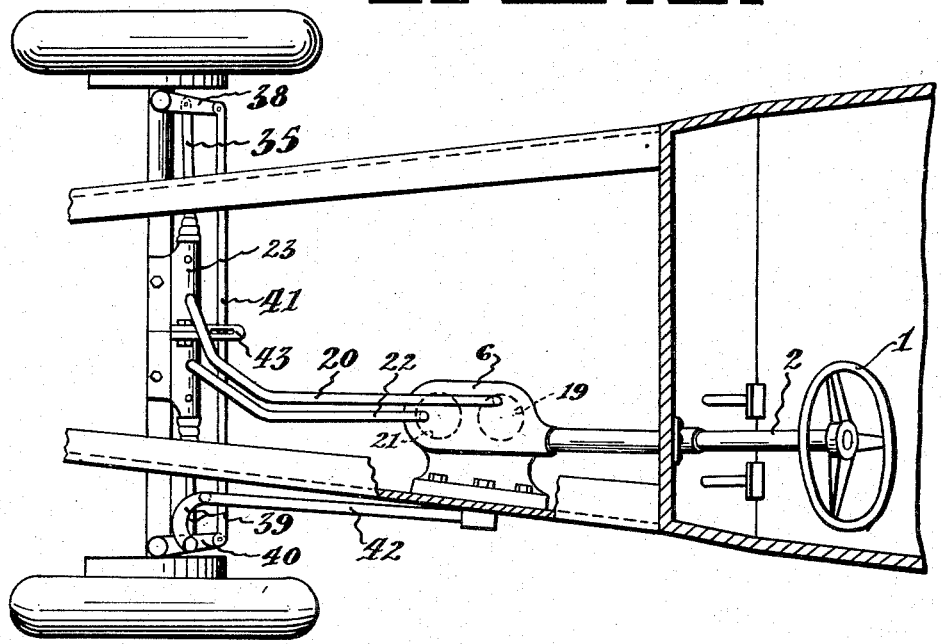
Figure 1 is a fragmentary plan view of the forward portion of a motor vehicle and showing the hydraulic steering mechanism attached thereto.
Figure 2:
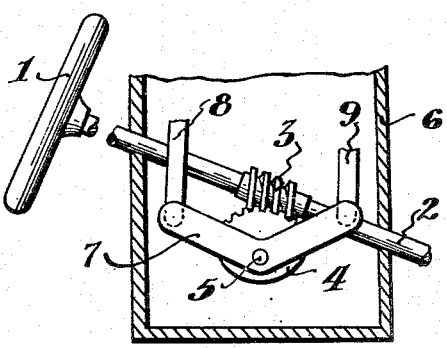
Figure 2 is a fragmentary view in elevation illustrating the means by which the position of master cylinders is controlled by rotation of the steering wheel of a motor vehicle.
Figure 3:
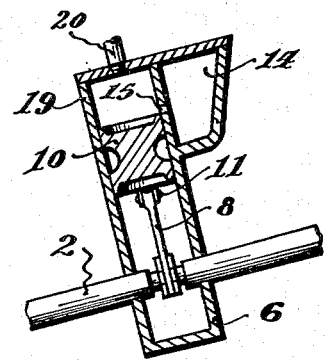
Figure 3 is a view in vertical and transverse section of one of the master cylinders, and showing the piston positioned therein.

Referring primarily to Figures 1 and 2, the reference numeral 1 denotes the steering wheel of a motor vehicle. A steering post 2 is provided with a worm gear 3 which serves to enmesh a worm quadrant. This quadrant is rigidly affixed to a shaft 5 which is transversely arranged within a housing 6. A bell crank 7 is keyed or otherwise suitably secured to the shaft 5, and is pivotally connected to connecting rods 8 and 9. The connecting rod 8 is connected to a piston 10 by means of a wrist pin 11, and the connecting rod 9 is similarly connected to a piston 12 by means of a wrist pin 13.

An eccentrically located fluid supply reservoir 14, shown best in Figure 4, is provided with ports 15 and 17. A fluid chamber 19 is provided with a fluid passage way 20 and the chamber 21 is similarly provided with a fluid passage 22. The fluid pipes 20 and 22 communicate at their forward ends with a housing 23 which housing is preferably mounted upon the front axle of the vehicle.

Referring to Figure 5 it will be seen that an annular and centrally located opening 24 is arranged as shown and is provided with a rod 25, which rod is positioned intermediate the diaphragms 26 and 27. A moving plunger 28 is positioned intermediate the diaphragm 26 and a check valve 29. A moving plunger 30 is likewise positioned intermediate the diaphragm 27 and a check valve 31. These check valves may be of the spring loaded ball type, illustrated in Figure 5, or any other suitable type capable of forming a tight seal and arranged for ready release.

A piston cylinder 32 is formed within one end of the housing 23 and a similar cylinder 33 is formed within the opposite end of the housing. A piston 34 is arranged within the cylinder 32, and a similar piston, not shown, is likewise arranged within the cylinder 33. A connecting rod 35 is pivotally connected at 36 to the piston 34. A similar arrangement is positioned within the piston within the cylinder 33. A flexible boot 37 serves to prevent ingress of moisture or gritty material. The connecting rod 35 is pivotally connected to a steering knuckle arm 38. A connecting rod 39, shown only in Figure 1 is likewise connected to a steering knuckle arm 40. The knuckle arms 38 and 40 are pivotally interconnected by a tie rod 41.

Referring to Figure 1, the reference numeral 42 denotes any conventional form of drag link which is suitably connected to the steering knuckle arm 40 and is actuated by rotation of the steering wheel 1. This mechanism is effective in turning the wheel only in case of failure in the hydraulic system, thereby providing an added factor of safety.

Referring to Figure 5, the reference numeral 43 denotes a valve control arm which is pivoted to the housing 23 at 44. The arm 43 is provided with a slot 45 which serves to embrace a vertically arranged pin 46, which pin is fixedly arranged to the tie rod 41. A fork 47 is provided and arranged to loosely surround a vertically arranged pin 48, affixed to the rod 25. Thus the valve control arm 43 will in no wise operate the rod 25 when the steering mechanism is under hydraulic control due to the clearance between the fork 47 and the pin 48.

Bleeder valves 49 and 50 are positioned as shown in Figure 5 in order that the system may be cleared of any air therein. By this means the hydraulic steering system may be cleared of compressible media and completely filled with a liquid, and hence is effective to move the wheels of a vehicle or other steering device in direct accordance with movement of the steering wheel.

In operation when the steering wheel 1 is so positioned that the front wheels of the vehicle are in the position shown in Figure 1, the vehicle is constrained to move only in a direct forward or reverse path, since no unbalanced hydraulic force is imposed upon either of the control pistons.

If, however, the steering wheel 1 is rotated, the worm 3 is effective to rotate the worm quadrant 4 and hence the bell crank 7. The piston 10 or the piston 12 is thereby raised in its cylinder depending upon the direction of rotation of the steering wheel. Assuming the direction of rotation of the steering wheel 1 to be such as to raise the piston 10 and simultaneously lower the piston 12, it will be seen that a force is exerted upon the fluid within the chamber 19 to expel the same through a fluid conduit 20.

Referring to Figure 5, it will be seen that the fluid conduit 20 communicates with an interior passage way within the housing 23. Hydraulic pressure when impressed upon the fluid within the pipe 20 is effective in raising the check valve 29 from its seat against the resistance of its spring and thus pressure is transmitted to the head of the piston 34 which pressure urges the piston and its connecting rod 35 to the left.

Simultaneously hydraulic pressure is exerted against the diaphragm 26 thereby urging the rod 25 to the right. This movement causes a movement to the right of the plunger 30, which movement is effective in moving the ball check valve 31 from its seat. Fluid within the chamber 33 is thereby enabled to flow through the pipe 22 to the cylinder 21 to which it is connected adjacent the lower end of the steering post.

Obviously, during a reverse motion of the steering wheel 1 relative to that above described, fluid pressure is transmitted through the pipe 22 and the valve 31 is raised from its seat. Pressure is thus transmitted into the cylinder 33 and relieved from within the cylinder 32. Since the structure is symmetrical with respect to its mid point, it will be seen that an equal turning effect is attained when the steering wheel 1 is rotated either clockwise or counterclockwise.

The arm or trip lever 43 is provided with the slot 45 as hereinabove described, which slot is arranged so as to slidably surround the pin 46, which pin is fixedly positioned upon the tie rod 41. The purpose of this structure is to provide a safety feature which will enable an operator to control the vehicle should the hydraulic steering apparatus fail due to, for example, leakage in the pipes 20 or 22 to set up a pressure differential between opposite units of the fluid system. In case of such failure the rod 25 would be immediately moved by the arm 43 to actuate a diaphragm 26—27, and consequently the rod 25 and a plunger 28—30 thereby allowing fluid to return from a wheel cylinder 32 or 33 depending upon the location of failure within the hydraulic system. It will be understood that the mechanical steering is only effective in the above described emergencies, and that the arm 43 will in no wise operate the rod 25 when the hydraulic steering is operating, since the fork 47 has clearance around the pin 48 and therefore does not move until after the rod 25 has been moved by means of an hydraulic force imposed as hereinabove described.

Manifestly, the construction as shown and described is capable of some modification and such modification as may be construed within the scope and meaning of the appended claims is also considered to be within the spirit and intent of the invention.

What is claimed is:

1. An hydraulic steering apparatus for vehicles including a pair of master cylinders, pistons in said cylinders actuated by movement of a steering unit, a second pair of cylinders, a fluid conduit connecting each of said master cylinders to a cylinder of said second pair of cylinders, means connecting each of the pistons of said latter cylinders to a steering knuckle arm, said arms being interconnected by a tie rod to effect simultaneous movement of said steering knuckle arms, valve means alternately operable to control the ingress and egress of fluid into and out of the second pair of cylinders alternately, and means including diaphragms and having connection with said tie rod for effecting release of fluid from one or the other of said second pair of cylinders when the pressure differential in opposing units of the assembly is other than a predetermined value.

2. An hydraulic steering apparatus for motor vehicles including a pair of oppositely movable pistons positioned within master cylinders, a housing disposed between the front wheels of the vehicle and having a pair of pistons therein, fluid conduits connecting said master cylinders with cylinders within said housing, pivoted links connecting each of said pistons within said housing to the steering apparatus of said vehicle, valve means interposed between said cylinders within said housing controlling fluid actuated therein by said master cylinder pistons and means including diaphragms, having connection with the steering apparatus of said vehicle also operating said valve means when the pressure differential in the opposing unit of said assembly is other than a predetermined value.

3. An hydraulic steering apparatus for motor vehicles including a pair of oppositely movable pistons positioned within master cylinders, a housing affixed to the front axle of the vehicle, a pair of pistons positioned in cylinders within said housing, fluid conduits connecting said master cylinders with said cylinders within said housing, means connecting each of said latter pistons to the steering apparatus of said vehicle, a pair of spaced and oppositely operated check valves interposed between the cylinders within said housing and fluid pressure actuated diaphragm means in control of the flow of fluid, said diaphragm means being interposed between said check valves and capable of actuating said check valves when the pressure differential in oppositely disposed units of said apparatus is other than a predetermined value.

4. An hydraulic steering apparatus for vehicles including a pair of interconnected and oppositely movable pistons, said pistons being positioned within master cylinders, means to constrain said pistons to move as the steering wheel of the vehicle is rotated, a housing affixed to the front axle of the vehicle, a pair of pistons positioned in cylinders defined by said housing, fluid conduits connecting said master cylinders with the cylinders within said housing, links connecting each of said latter pistons to the steering knuckles of said vehicle, a pair of spaced and spring loaded check valves interposed between the cylinders within said housing, means including diaphragms in control of the flow of fluid to the cylinders within said housing, said means being movable with the tie rod of said vehicle to effect release of fluid pressure in said latter cylinders when the pressure differential between oppositely disposed units of the fluid system is other than a predetermined value, and means whereby the vehicle may be manually actuated by an operator when the pressure within the fluid system is released.

LESLIE W. STINNE.